(12) United States Patent
Sviberg

(10) Patent No.: US 12,741,614 B2
(45) Date of Patent: Sep. 22, 2026

(54) SENSOR MODULE HAVING A CLEANING APPARATUS, ROOF MODULE AND MOTOR VEHICLE

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 207 days.

(21) Appl. No.: 18/650,889

(22) Filed: Apr. 30, 2024

(65) Prior Publication Data

US 2024/0367615 A1 Nov. 7, 2024

(30) Foreign Application Priority Data

May 2, 2023 (DE) .................... 10 2023 111 282.1

(51) Int. Cl.
*B60S 1/52* (2006.01)
*B60S 1/54* (2006.01)
*B60S 1/56* (2006.01)

(52) U.S. Cl.
CPC ............... *B60S 1/522* (2013.01); *B60S 1/544* (2013.01); *B60S 1/56* (2013.01)

(58) Field of Classification Search
CPC .... B60S 1/52; B60S 1/522; B60S 1/54; B60S 1/544; B60S 1/56; B60S 1/566; B60S 1/60; B60S 1/0822; B60R 11/00; B60R 2011/004; B62D 25/06
See application file for complete search history.

(56) References Cited

U.S. PATENT DOCUMENTS

2003/0066909 A1* 4/2003 Jenkins .................. B60S 1/528 15/250.002
2019/0003895 A1* 1/2019 Krishnan ............... B60R 11/04
2022/0169314 A1 6/2022 Huelsen et al.
2023/0075491 A1 3/2023 Langlais

FOREIGN PATENT DOCUMENTS

DE 10 2019 122 193 B4 3/2021
DE 10 2021 122 877 A1 3/2023

OTHER PUBLICATIONS

Office Action issued against corresponding German Application No. 10 2023 111 282.1; dated Apr. 15, 2024; English Machine Translation (6 pages).

* cited by examiner

*Primary Examiner* — Steven M Sutherland
(74) *Attorney, Agent, or Firm* — Fitch, Even, Tabin & Flannery, LLP

(57) ABSTRACT

A sensor module for being fixed to a vehicle. The sensor module may have at least one environment sensor, a panel component having a viewing area, through which the at least one environment sensor transmits and/or receives electromagnetic signals for charting an environment of the vehicle, and at least one cleaning apparatus, which has at least one cleaning nozzle by which the viewing area is cleaned. The at least one cleaning apparatus may have a guide lever which is rotationally connected to the at least one cleaning nozzle and which guides the at least one cleaning nozzle for an in particular combined longitudinal movement along a movement axis and a rotational movement about a rotational axis.

11 Claims, 9 Drawing Sheets

SENSOR MODULE HAVING A CLEANING APPARATUS, ROOF MODULE AND MOTOR VEHICLE

CROSS-REFERENCE TO RELATED APPLICATION(S)

This application claims the benefit of German patent application no. 10 2023 111 282.1 filed on May 2, 2023, which is incorporated herein by reference in its entirety.

TECHNICAL FIELD

The invention relates to a sensor module for forming a vehicle roof on a motor vehicle. The invention relates to a sensor module for forming a vehicle roof on a motor vehicle. Furthermore, the invention relates to a roof module having at least one such sensor module. The invention also relates to a motor vehicle having a sensor module and/or a roof module.

BACKGROUND

Roof modules are widely used in vehicle manufacturing, since these roof modules can be prefabricated as separate functional modules and can be delivered to the assembly line when assembling the vehicle. The roof module at least partially forms a roof skin of the vehicle roof, the roof skin preventing moisture and airflows from entering the vehicle interior. The roof skin is composed of one or more panel components, which can be made of a stable material, such as painted metal or painted or solid-colored plastic. The roof module can be a part of a fixed vehicle roof or a part of an openable roof assembly.

Furthermore, the development in vehicle manufacturing is increasingly focused on autonomously and semi-autonomously driving motor vehicles. In order to enable the vehicle controller to control the motor vehicle autonomously or semi-autonomously, a plurality of environment sensors (e.g., lidar sensors, radar sensors, (multi-) cameras, etc. including other (electrical) components) and/or sensor modules are employed, which are integrated in the roof module, for example, and which chart the environment surrounding the motor vehicle and determine, for example, a current traffic situation from the acquired environment data. Roof modules which are equipped with a plurality of environment sensors are also known as roof sensor modules (RSM). The known environment sensors transmit and/or receive electromagnetic signals, allowing a data model of the vehicle environment to be generated by suitable signal evaluation and to be used for controlling the vehicle.

The sensor modules which comprise environment sensors for monitoring and charting the vehicle environment are typically disposed in the area of the vehicle roof, since the vehicle roof is typically the highest point of a vehicle, from where the vehicle environment is easily visible. The sensor modules are typically placed on top of the panel component of the roof module, which forms the roof skin, as attachments or are covered by the panel component. Alternatively, sensor modules of this kind can also be disposed in an opening of the panel component and be displaceable between a retracted position and an extended position.

When the environment sensor is in use, ambient conditions, such as weather, pose the risk that a (partially) transparent viewing area, through which the environment sensor charts the vehicle environment, accumulates dirt, i.e., becomes opaque to the environment sensor. For cleaning the viewing area, the use of a cleaning nozzle by means of which the viewing area can be cleaned is known. Similar to spray nozzles of a windshield wiper system, the known cleaning nozzles are typically disposed statically in an area of the roof module or the panel component which is located in front of the environment sensor when viewed in the direction of an optical axis of the environment sensor. The cleaning nozzles are thus disposed in the field of view of the environment sensor and protrude from the roof skin.

SUMMARY

This arrangement of the cleaning nozzles is disadvantageous for several reasons. Firstly, the cleaning nozzles protruding from the roof skin do not meet the aesthetic requirements of a vehicle design. Secondly, the cleaning nozzles are positioned in front of the environment sensor in its field of vision. In this field of vision, the cleaning nozzles cause blind areas due to shading of the field of vision, the environment sensor not being able to accurately perceive the vehicle surroundings in these blind areas. As these blind areas become larger with increasing distance from the environment sensor due to trigonometric-optical relationships, "blind spots" can occur in the field of vision for the environment sensor. Permanently mounted cleaning nozzles often require a large installation space in a longitudinal vehicle direction and are susceptible to turbulence caused by driving wind and the associated loss of cleaning effectiveness.

In avoidance of these problems, cleaning nozzles are also known which can be displaced between a retracted state and an extracted state. One such cleaning nozzle can be found, for example, in DE 10 2019 122 193 B4. However, the displaceable cleaning nozzles require much installation space in a vehicle height direction, as the displacement mechanism of the respective cleaning nozzle must be disposed underneath the roof skin and/or an outer skin of the sensor module.

An object of the invention is to propose an improved sensor module.

This object is attained by a sensor module having the features of claim 1. This object is attained by a sensor module having the features of claim 5.

Advantageous embodiments of the invention are the subject matter of the dependent claims. Any and all combinations of at least two features disclosed in the description, the claims, and/or the figures fall within the scope of the invention. Naturally, the explanations given in connection with the sensor module equivalently relate to the roof module according to the invention and/or the motor vehicle according to the invention, without being mentioned separately in their context. In particular, linguistically common rephrasing and/or an analogous replacement of respective terms within the scope of common linguistic practice, in particular the use of synonyms backed by the generally recognized linguistic literature, are of course comprised by the content of the disclosure at hand, without every variation having to be expressly mentioned.

In a first aspect, a sensor module for being fixed to a motor vehicle is proposed. The sensor module has at least one environment sensor and a panel component having a viewing area, through which the at least one environment sensor can transmit and/or receive electromagnetic signals for charting an environment of the vehicle. The sensor module further comprises at least one cleaning apparatus, which comprises at least one cleaning nozzle by which the viewing area is cleanable in particular by a cleaning fluid being applied. The at least one cleaning apparatus has a guide lever which is rotationally connected to the at least one cleaning nozzle and which guides the at least one cleaning nozzle for an in particular combined longitudinal movement along a movement axis and a rotational movement about a rotational axis.

In a second aspect, a sensor module for being fixed to a motor vehicle is proposed. The sensor module has at least one environment sensor and a panel component having a viewing area, through which the at least one environment can transmit and/or receive electromagnetic signals for charting an environment of the vehicle. The sensor module can furthermore have at least one cleaning apparatus, which comprises at least one cleaning nozzle by which the viewing area is cleanable in particular by a cleaning fluid being applied. The at least one cleaning apparatus has a guide lever which is rotationally connected to the at least one cleaning nozzle and which executes a longitudinal movement along a second movement axis and a rotational movement about a second rotational axis in order to guide the at least one cleaning nozzle (30) for at least one rotational movement about a rotational axis.

The two aspects preferably concern alternative designs from a technical viewpoint.

The invention is advantageous because a cleaning apparatus having an improved function can be provided. Due to the provision of the guide lever, the cleaning apparatus is more stable and thus less susceptible to weather-related failures. Furthermore, the cleaning apparatus requires less space than known cleaning apparatuses and can be implemented more compactly in a sensor module and/or a roof module and/or a motor vehicle. The cleaning apparatus and/or the sensor module equipped therewith improves the styling and/or the overall appearance. The cleaning apparatus according to the invention can also reduce weight. Due to the simple mechanical design, the cleaning apparatus can also be manufactured and/or implemented cost-effectively.

In known solutions, the cleaning nozzles, which are often permanently installed, are disposed in front of the viewing area to be cleaned and require a large installation space in the longitudinal vehicle direction (in the case of front and/or rear arrangement) and/or in the direction of the optical axis of the environment sensor (in the case of lateral and/or inclined arrangement). Displaceable cleaning nozzles, on the other hand, are disposed close to the viewing area to be cleaned, but require large installation space and/or space in a vehicle height direction, which is only insufficiently available in the roof area in particular.

According to the invention, on the other hand, a simply designed displacing kinematic system is provided, by means of which the cleaning nozzle can be displaced in the combined longitudinal and rotational movement. Alternatively, a displacing kinematic system is provided in which a guide lever, through which the at least one cleaning nozzle is guided during the displacement movement, performs a longitudinal movement along the second longitudinal axis and a rotational movement about a second rotational axis. Advantageously, the guide lever first executes the longitudinal movement and then and/or in combination executes the rotational movement. As a result, the at least one cleaning nozzle can preferably be displaced and/or retracted and/or extended between a retracted state and at least one extended state. In the at least one extended state, the at least one cleaning nozzle is preferably in a cleaning position in which the viewing area can be cleaned. According to the invention, the longitudinal movement of the cleaning nozzle is preferably also translated into the rotational movement by the guide lever in this context, so that the cleaning nozzle can also be folded out and/or extended. In the proposed solutions, the extendable cleaning nozzle is preferably positioned essentially horizontally and/or in the vicinity of the viewing area. Of course, the at least one cleaning apparatus and/or the at least one cleaning nozzle can also be positioned above and/or below and/or to the side of the viewing area, in each case viewed in the direction of the optical axis of the environment sensor.

The environment sensor is preferably disposed in a sensor casing. The panel component can be part of the sensor casing. Alternatively or additionally, the panel component can at least partially overlap and/or cover the at least one environment sensor. The panel component can also be part of a roof skin of a motor vehicle and/or a roof module of the motor vehicle. The viewing area can be integrally formed in the panel component. The viewing area can alternatively or additionally be disposed and/or provided as a window in an opening of the panel component. The viewing area is preferably at least partially transparent for wavelengths used by the environment sensor. The cleaning apparatus can of course comprise several cleaning nozzles so that the viewing area can be cleaned as completely as possible. The preferred cleaning fluid can be liquid and/or gaseous and/or contain solids. The guide lever is preferably designed to support and/or hold the at least one cleaning nozzle, for example during the combined displacement movement. In particular, the guide lever is designed to support the at least one cleaning nozzle relative to a surrounding support component, which may be part of the sensor module and/or part of a surrounding vehicle structure. The support component may, for example, comprise a mounting frame and/or a mounting component and/or a body component. According to the first aspect, the cleaning nozzle preferably performs a displacement movement which at least partially comprises a longitudinal movement and/or a linear movement along the movement axis and also at least partially comprises a rotational movement about the rotational axis. The longitudinal movement can take place together with the rotational movement. According to the second aspect, the cleaning nozzle preferably "only" performs a rotational movement about the rotational axis, and not necessarily a longitudinal movement along a longitudinal axis.

In a preferred embodiment according to the first aspect, the at least one cleaning nozzle is displaceable between retracted position and an extended position owing to the in particular combined longitudinal movement and rotational movement. It is understood that the at least one cleaning nozzle can also be displaced to any number of intermediate positions between the retracted position and the extended position. In the retracted position, the at least one cleaning nozzle is preferably stowed and/or completely accommodated in the sensor module. In the at least one extended position, the at least one cleaning nozzle preferably protrudes and/or projects beyond the panel component.

In a preferred embodiment according to the second aspect, characterized in that the at least one cleaning nozzle is displaceable between a retracted position and an extended position via the longitudinal movement and the rotational movement of the guide lever. It is understood that the at least one cleaning nozzle can also be displaced to any number of intermediate positions between the retracted position and the extended position. In the retracted position, the at least one cleaning nozzle is preferably stowed and/or completely accommodated in the sensor module. In the at least one extended position, the at least one cleaning nozzle preferably protrudes and/or projects beyond the panel component.

In a preferred embodiment, the at least one cleaning nozzle has a telescope nozzle having at least two telescopic segments. One of the at least two telescopic segments is movable in relation to the other of the at least two telescopic segments via the longitudinal movement along the movement axis. The at least one guide lever is mounted at its one end so as to be rotational at one of the at least two telescopic segments. The at least one guide lever is further mounted at its other end so as to be rotational at a support component of the sensor module and/or a roof module and/or a motor vehicle. The guide lever is therefore preferably supported on the support component at its one end and is rotationally mounted thereon by means of an articulated joint, for example. At the other end, the guide lever is preferably rotationally mounted on the at least one telescopic segment, via an articulated joint, the telescopic segment being able to be moved relative to another telescopic segment. This mounting of the guide lever allows the longitudinal movement to be translated into a rotational movement. The additional guide lever can also comprise several levers. Each such lever can be connected to at least one other lever and/or another support component via at least one articulated joint. The guide lever can therefore preferably be multi-jointed.

In a preferred embodiment, the guide lever translates the longitudinal movement along the movement axis into the rotational movement about the rotational axis owing to its arrangement. Since the extendable cleaning nozzle can be activated, for example, by a fluid pressure of the cleaning fluid, the otherwise purely longitudinal movement can also be translated into a rotational movement by the guide lever.

In a preferred embodiment, the environment sensor has an optical axis. The field of view and/or field of vision of the environment sensor preferably extends around the optical axis of the environment sensor. The at least one cleaning nozzle is disposed transverse, preferably orthogonal or at an angle of incidence, in particular less than 90° to the optical axis. The at least one cleaning nozzle is disposed preferably in such a manner that the movement axis or the second movement axis is aligned transverse to the optical axis and the rotational axis is aligned essentially parallel to the optical axis.

In a preferred embodiment, the at least one cleaning apparatus comprises a cover, which preferably aligns flush with the panel component in the retracted position of the at least one cleaning nozzle. The cover can be integrally formed on the cleaning nozzle and/or on a telescopic segment of the cleaning nozzle. The cover can also be fixed to the at least one cleaning nozzle. The cover can comprise a seal by which the cover is sealed off from the panel component in the retracted position. The seal may alternatively or additionally be provided on the panel component and seal against the cover when it is in the retracted position. In other words, the cleaning apparatus may comprise the cover, which covers the cleaning nozzle and the displacement mechanism, in particular the guide lever, when the cleaning nozzle is retracted. The cover is preferably fixedly connected to the cleaning nozzle, so that it can be retracted and extended with the cleaning nozzle. A part of the cleaning nozzle can also be displaceable relative to the cover, in particular telescopically extendable, and thus, for example, protrude relative to the cover in the extended position.

In a preferred embodiment, the cover has a wind deflector for deflecting an airflow from the at least one cleaning nozzle and/or from the at least one part of the viewing area, the wind deflector being disposed on the cover or being formed in one piece with the cover. The wind deflector can, for example, project like a shield from the cover in the direction of the panel component. The wind deflector can preferably be displaced between the retracted position and the extended position using the at least one cleaning nozzle. In the retracted position, the wind deflector is preferably disposed entirely below the panel component, in particular in an installation space of the cleaning apparatus. In addition, the optional cover can be shaped in such a manner that it comprises a wind deflector and/or wind spoiler. This wind deflector can be integrated in the cover itself. This further improves the cleaning function even at higher speeds.

In a preferred embodiment, the wind deflector is made of a flexible, in particular mat-shaped material which extends between the cover and the panel component. Alternatively, the wind deflector can therefore extend between the cover and the panel component and/or a support component, in particular as a flexible folding cloth. This further improves the cleaning function even at higher speeds.

In a preferred embodiment, the wind deflector defines a wind-deflector surface, which extends along the movement axis or the second movement axis and transverse to the movement axis and transverse to the rotational axis, at least in the extended position of the at least one cleaning nozzle.

In a preferred embodiment, the at least one cleaning nozzle is movable via a fluid pressure of a cleaning fluid and/or via an electric and/or hydraulic and/or pneumatic drive. Particularly preferably, this allows the longitudinal movement of the at least one cleaning nozzle. This can then be translated into the rotational movement by the provision of the guide lever. Particularly preferably, the at least one cleaning nozzle is telescopically displaced.

In a preferred embodiment, the environment sensor comprises a lidar sensor and/or a radar sensor and/or a camera sensor and/or a multi-camera and/or an ultrasonic sensor. Lidar sensors operate in a wavelength range of 905 nm or about 1,550 nm, for example. The material in the viewing area is transparent to the wavelength range used by the environment sensor and should hence be selected as a function of the wavelength range(s) used by the environment sensor.

The invention also relates to a roof module for forming a vehicle roof on a vehicle, the roof module having a panel component, which forms at least a section of a roof skin of the vehicle roof, the roof skin functioning as an outer sealing surface of the roof module, the roof module having at least one sensor module. The roof module according to the invention can form a structural unit in which apparatuses for autonomous or semi-autonomous driving supported by driving assistance systems are integrated and which can be mounted as a unit on a vehicle body shell by a vehicle manufacturer. Furthermore, the roof module according to the invention can be designed as a pure fixed roof or as a roof together with a roof opening system. In addition, the roof module can be designed for use in a passenger car or in a commercial vehicle. The roof module can preferably be provided as a structural unit in the form of a roof sensor module (RSM), in which the environment sensors are provided in order to be inserted as a deliverable structural unit in a roof frame of a vehicle body. The panel component can correspond at least partially or in some areas to the panel component of the sensor module. The panel component can at least partially overlap the at least one environment sensor. The panel component can also be part of a sensor casing in which the at least one environment sensor is disposed.

The invention also relates to a motor vehicle having a vehicle body and a roof module, which is disposed on the vehicle body as a structural unit, and/or having at least one sensor module according to any embodiment of the invention. The roof module can form a structural unit in which apparatuses for autonomous or semi-autonomous driving supported by driving assistance systems are integrated and which can be disposed as a unit on a vehicle body shell by a vehicle manufacturer. Furthermore, the roof module according to the invention can be designed as a pure fixed roof or as a roof together with a roof opening system. In addition, the roof module can be designed for use in a passenger car or in a commercial vehicle. The roof module can preferably be provided as a structural unit in the form of a roof sensor module (RSM), in which the sensor modules and/or environment sensors are provided in order to be inserted as a deliverable structural unit in a roof frame of a vehicle body.

In a further preferred embodiment, the sensor module is disposed on a mudguard, a bumper, an outer trim component of a sunroof, a window, a door, a sunroof, a soft top, a folding roof, a hood or a trunk lid. In principle, other arrangement positions of the sensor module on a motor vehicle not mentioned here are also covered by the invention. It is understood that a motor vehicle can comprise several sensor modules according to any embodiment of the invention.

Of course, the embodiments and the exemplary embodiments mentioned above and yet to be discussed below can be realized not only individually but also in any combination with each other without departing from the scope of the present invention. Moreover, any and all embodiments and exemplary embodiments also relate to any and all embodiments of the invention in an equivalent or at least similar manner, without having to be mentioned individually.

BRIEF DESCRIPTION OF DRAWINGS

Embodiments of the invention are shown schematically in the drawings and are explained exemplarily below.

DETAILED DESCRIPTION

Figure 1:
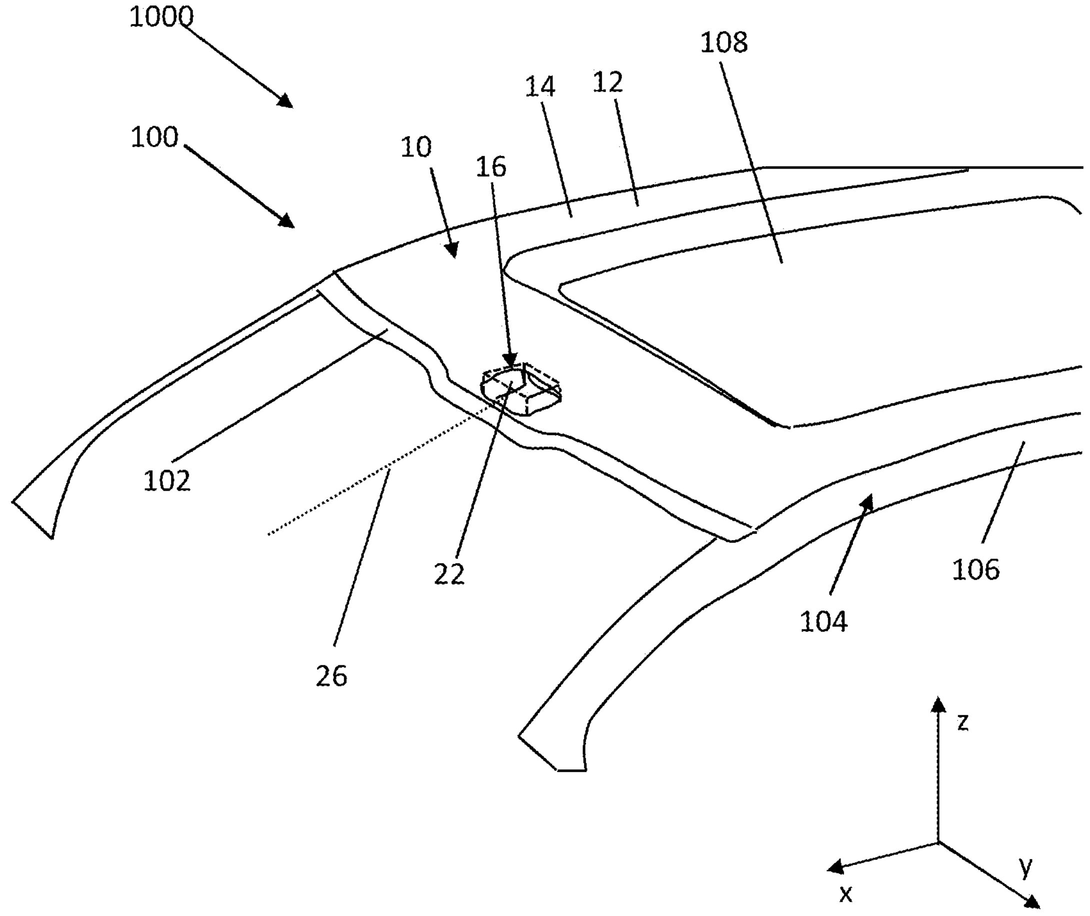
FIG. 1 shows a schematic representation of a vehicle roof of a motor vehicle in the form of a roof module.

FIG. 1 shows a vehicle roof 100 of a motor vehicle 1000 comprising a roof module 10. The roof module 10 comprises a panel component 12 for forming the roof skin 14 of the vehicle roof 100 of the motor vehicle 1000 (not shown in its entirety). The roof module 10 is preferably disposed as a structural unit on a roof frame 104 of the motor vehicle 1000. The roof frame 104 preferably comprises the at least two transverse beams 102 and at least two longitudinal beams 106. The roof module 10 in the exemplary embodiment shown has a panoramic roof 108.

In a frontal area of the vehicle roof 100 and/or the roof module 10, viewed in a longitudinal vehicle direction x, a sensor module 16 is disposed symmetrically to the longitudinal axis of the vehicle. The sensor module 16 is disposed directly behind a front transverse beam 102, which defines a roof-side front header of the motor vehicle 1000. The sensor module 16 comprises a panel component 12. The panel component 12 may be comprised in the panel component 12. Alternatively, the panel component 12 can be part of a sensor casing 18. The sensor module 16 can also be disposed in an opening (not shown in detail) in the roof module 10 so as to be retractable and extendable.

The panel component 12 comprises a viewing area 20, which can, for example, be made of a preferably shatter-proof plastic or other (partially) transparent material. Furthermore, the sensor module 16 comprises an environment sensor 22, which is at least partially covered by the panel component 12. The environment sensor 22 is a lidar sensor in the present case. Other sensor types, e.g., (multidirectional) cameras, can also be used. The environment sensor 22 is aligned along an optical axis 26, which in the case of FIG. 1 is aligned parallel to the longitudinal vehicle direction x. The longitudinal vehicle direction x is orthogonal to a vehicle width direction y. The longitudinal vehicle direction x and the vehicle width direction y are orthogonal to a vehicle height direction Z.

The sensor module 16 further comprises a cleaning apparatus 28, by means of which the viewing area 20 can be cleaned. The cleaning apparatus 28 comprises at least one cleaning nozzle 30, each of which can be supplied with a cleaning fluid (e.g., a liquid or a gas) through a supply channel (not shown). The cleaning fluid can, for example, be an aqueous soapy solution. Alternatively, cleaning with compressed air or another pressurized gas is also conceivable. When the cleaning fluid emerges from the cleaning nozzles 30, a jet of fluid is generated which hits the viewing area 20 and cleans it.

Figure 2:
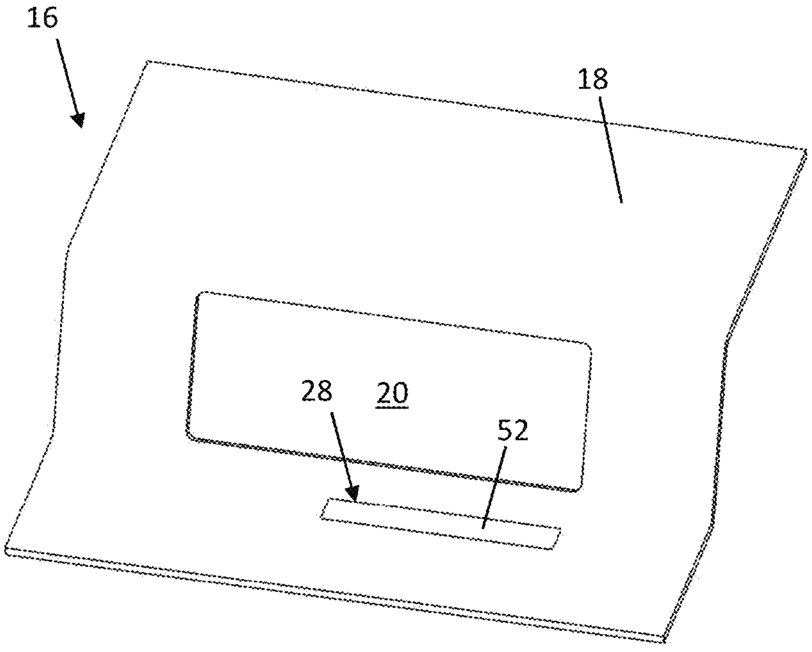
FIG. 2 shows a schematic view of a sensor module according to a first embodiment having a cleaning apparatus in a first position.
Figure 3:
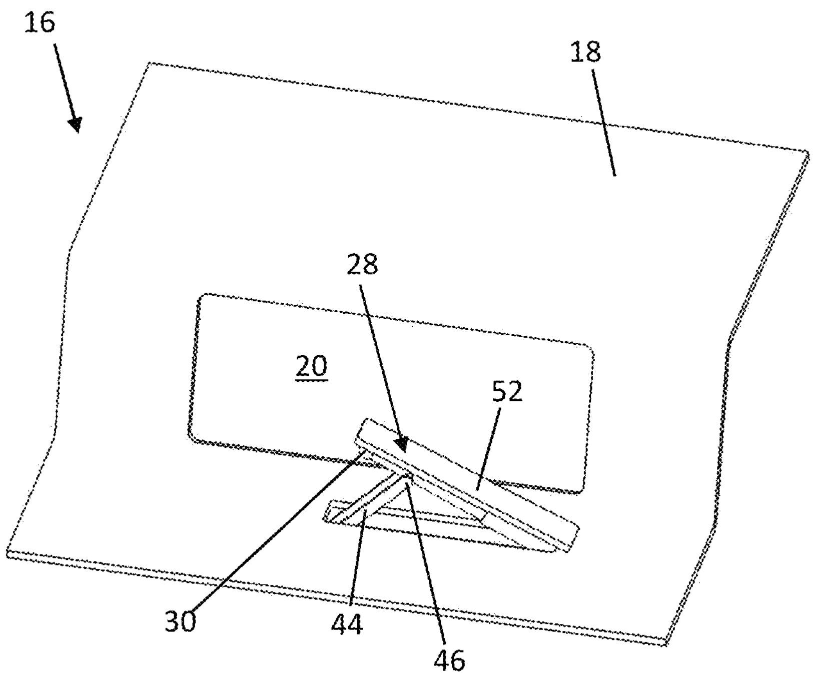
FIG. 3 a further schematic view of the sensor module according to the first embodiment having the cleaning apparatus in a second position.
Figure 4:
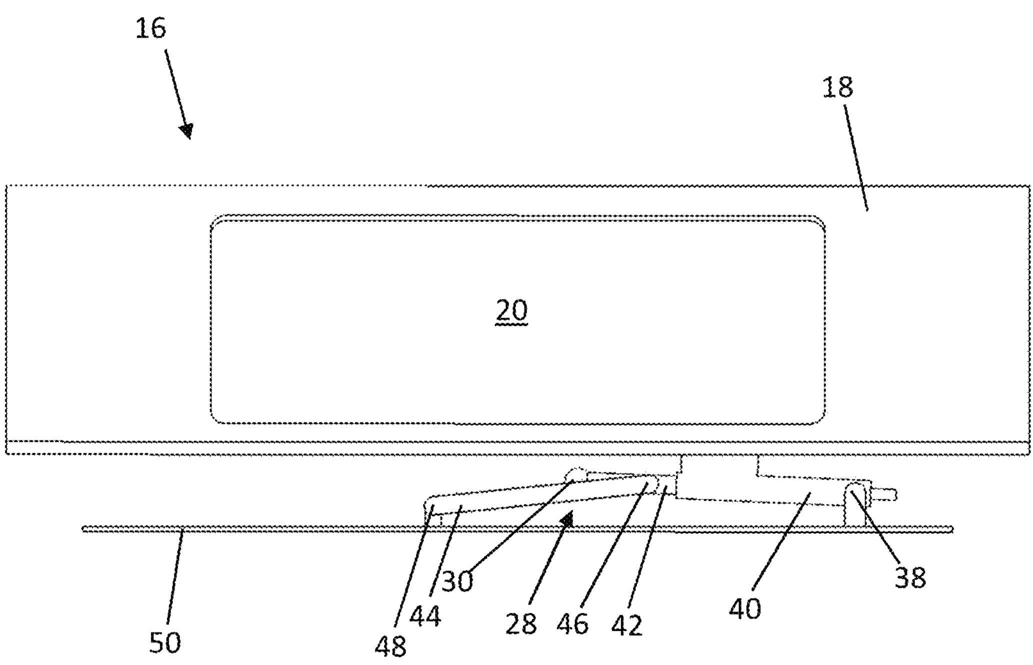
FIG. 4 a schematic sectional view of the sensor module according to the first embodiment having the cleaning apparatus in the first position.
Figure 5:
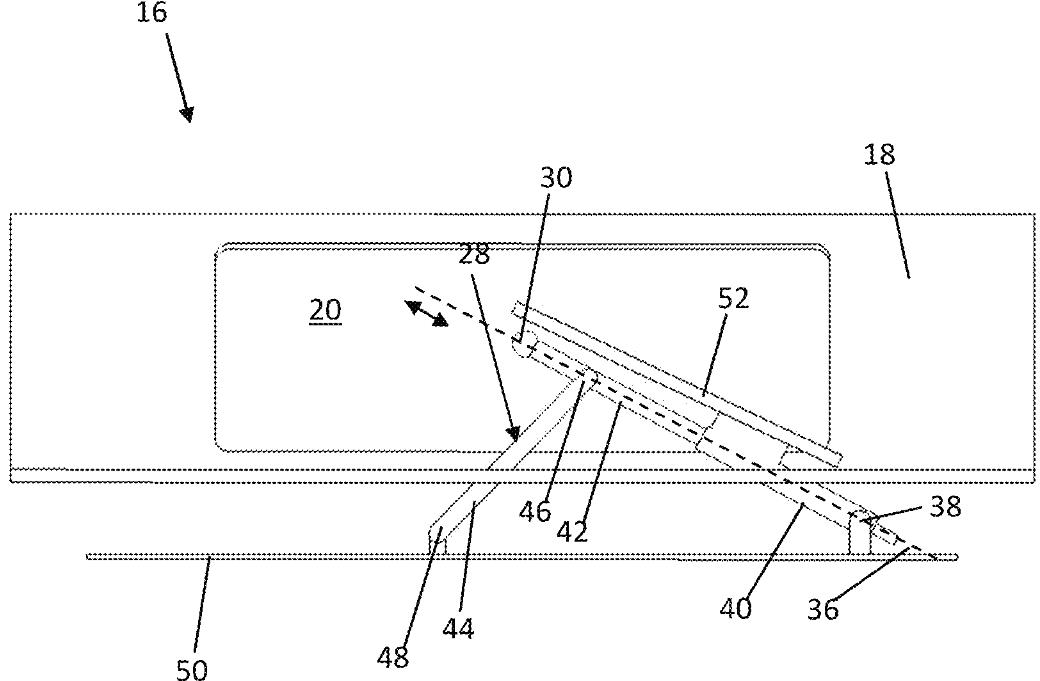
FIG. 5 a schematic sectional view of the sensor module according to the first embodiment having the cleaning apparatus in the second position.
Figure 6:
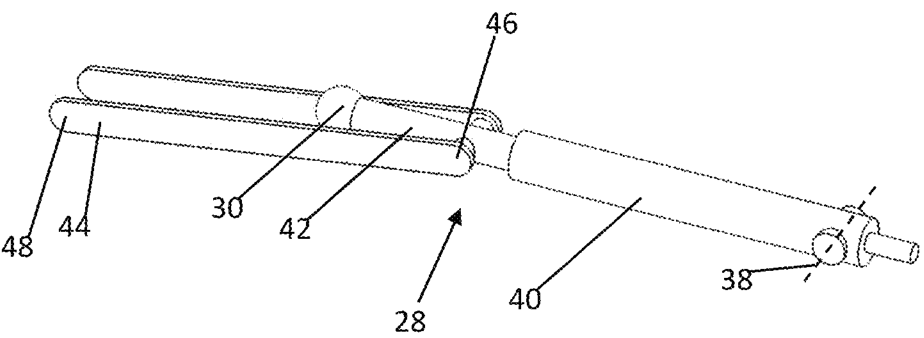
FIG. 6 shows a schematic view of the cleaning apparatus in the first position.
Figure 7:
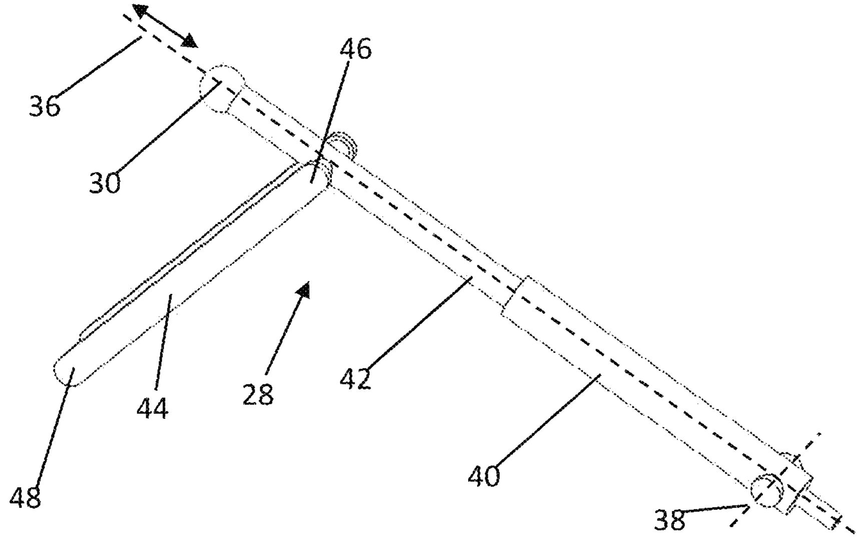
FIG. 7 shows a schematic view of the cleaning apparatus in the second position.

The cleaning nozzle 30 can be displaced and/or moved between a retracted position (see FIGS. 2, 4, 6) and at least one extended position (see FIGS. 3, 5, 7). The at least one cleaning nozzle 30 performs a combined movement comprising a longitudinal movement along a movement axis 36 and a rotational movement about a rotational axis 38. The rotational axis 38 is aligned parallel to the optical axis 26 of the environment sensor 22. The movement axis 36 is preferably aligned orthogonal or oblique to the rotational axis 38 in the present case. The at least one cleaning nozzle 30 is preferably designed as a telescopically displaceable cleaning nozzle. The at least one cleaning nozzle 30 preferably comprises at least two telescopic segments 40, 42. At least one telescopic segment 42 of the at least two telescopic segments 40, 42 is linearly displaceable along the movement axis 36 relative to the other telescopic segment 40 of the at least two telescopic segments 40, 42.

To translate the linear longitudinal movement into the rotational movement, the cleaning apparatus 28 comprises a guide lever 44, which is rotationally connected to the at least one cleaning nozzle 30. The at least one cleaning nozzle 30 is guided by the guide lever 44 in particular during the combined movement sequence. The guide lever 44 translates the longitudinal movement into the rotational movement. The at least one guide lever 44 is mounted at its one end 46 so as to be rotational on the one telescopic segment 42 of the at least two telescopic segments 40, 42. Furthermore, the at least one guide lever 44 is mounted at its other end 48, which is opposite the end 46, so as to be rotational on a support component 50 of the sensor module 16 and/or the roof module 10 and/or the motor vehicle 1000.

In the retracted position, the cleaning nozzle 30 is disposed in an interior of the sensor module 16 and/or is completely retracted into the interior. The cleaning apparatus 28 preferably comprises a cover 52, which can be integrally formed on the cleaning nozzle 30. In the retracted position of the at least one cleaning nozzle 30, the cover 52 preferably closes flush with the surrounding panel component 12.

Figure 8:
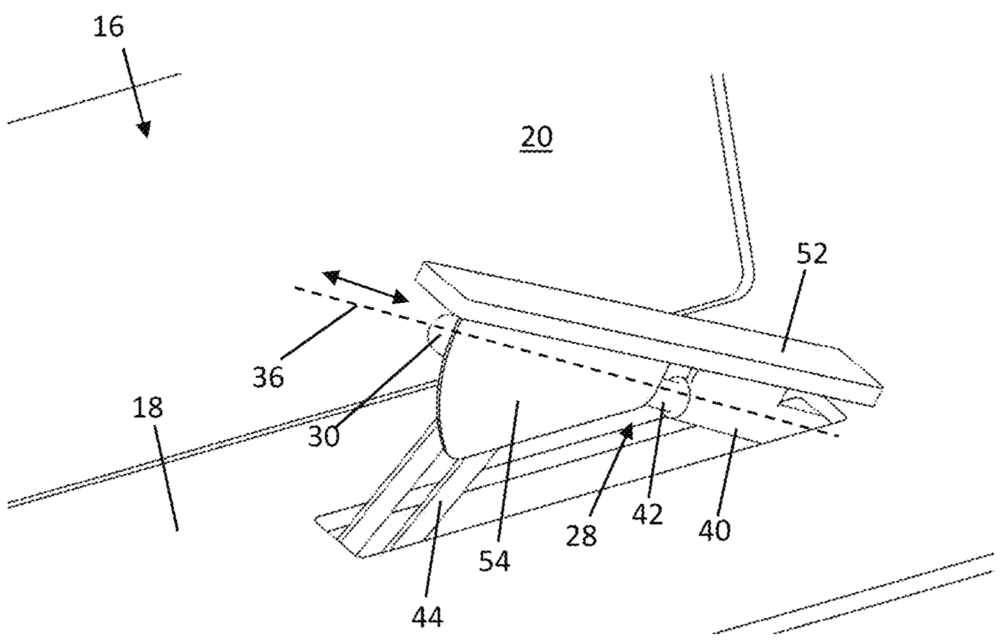
FIG. 8 shows a schematic view of the sensor module according to a second embodiment having the cleaning apparatus in the second position.
Figure 9:
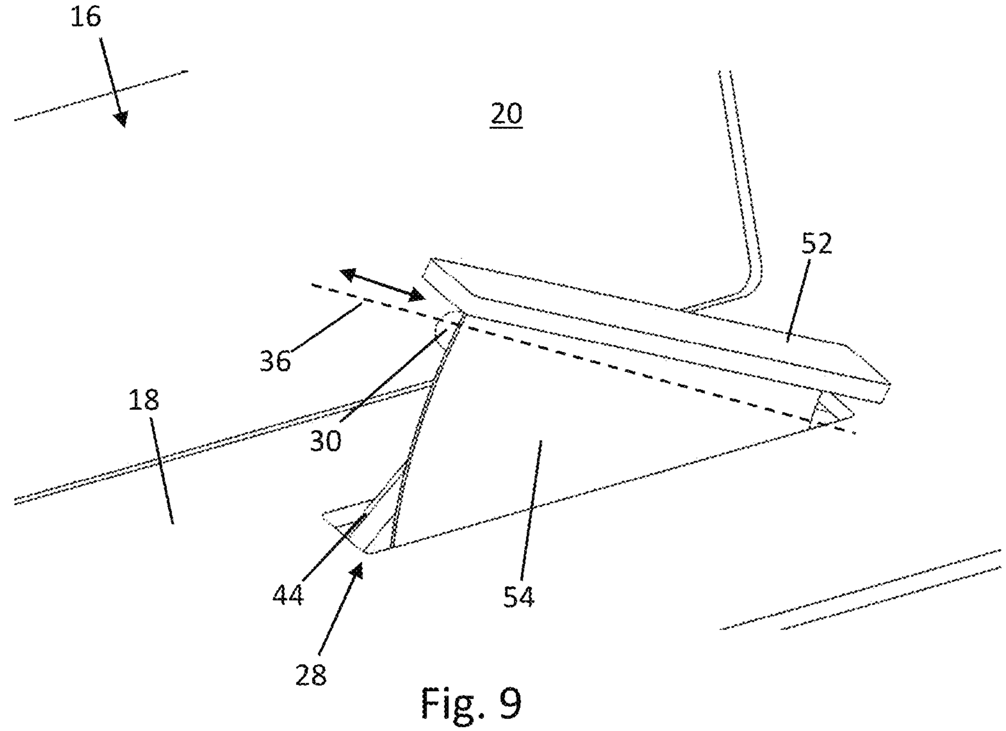
FIG. 9 shows a schematic view of the sensor module according to a third embodiment having the cleaning apparatus in the second position.

The cover 52 preferably comprises a wind deflector 54 for deflecting a driving wind from the at least one cleaning nozzle 30 and/or from at least a part of the viewing area 20. The wind deflector 54 is integrally formed on the cover 52 as shown in FIG. 8. Alternatively, the wind deflector 54 can be formed from a flexible, in particular mat-shaped material which extends between the cover 52 and the panel component 12, as shown schematically in FIG. 9. In the present case, the cleaning nozzle 30 can be retracted and extended and/or displaced by means of a fluid pressure of the cleaning nozzle 30.

Figure 10:
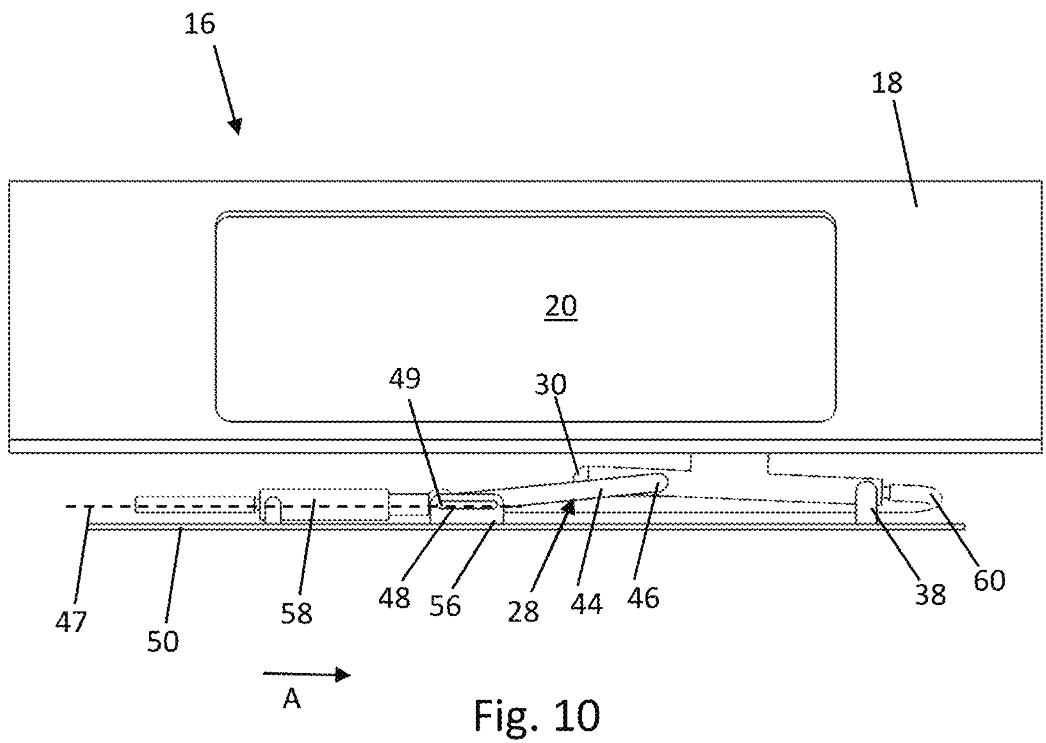
FIG. 10 shows a schematic view of the sensor module according to a fourth embodiment having the cleaning apparatus in the first position.
Figure 11:
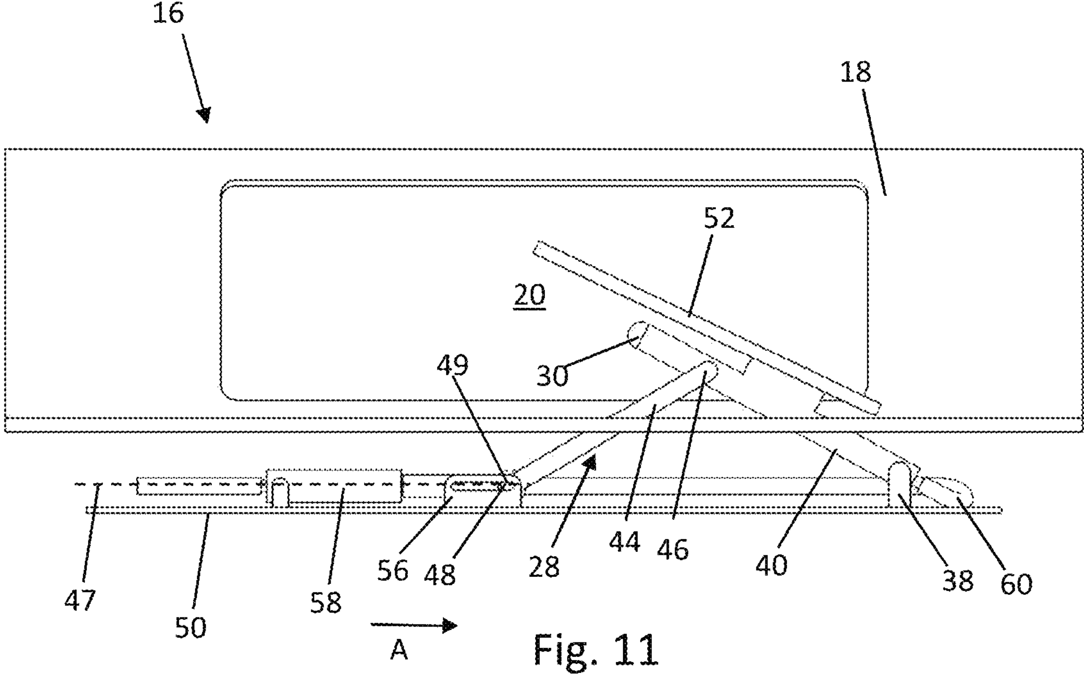
FIG. 11 shows a schematic view of the sensor module according to the fourth embodiment having the cleaning apparatus in the second position.

FIGS. 10 and 11 show a further embodiment, in particular according to the second aspect of the invention, of the sensor module 16. FIG. 10 shows the cleaning nozzle 30 in the retracted position. FIG. 11 shows the cleaning nozzle 30 in the extended position.

According to this embodiment, the guide lever 44 is also rotationally connected to the at least one cleaning nozzle 30 at least at its one end 46. The guide lever 44 performs a longitudinal movement along a second movement axis 47 and a rotational movement about a second rotational axis 49 to displace the cleaning nozzle 30 in order to guide the at least one cleaning nozzle 30 at least during a rotational movement about a rotational axis 38.

According to this embodiment, the cleaning nozzle 30 has no telescopic segments, but is designed as a non-extendable, in particular rod-shaped component, the length of which is preferably not adaptable. Unlike in the previous embodiments, the extension takes place in that the end 48 of the guide lever 44 is guided in a slider 56 so as to be displaceable along the second movement axis 47. The pivot point defined by the end 48 about the rotational axis 49 is therefore displaceable along a groove of the slider 56, which in the present case extends parallel to the support component 50. The displacement and/or actuation for retracting and extending the cleaning nozzle 30 can preferably be effected by the pressure of the cleaning fluid. To extend the cleaning nozzle 30, the guide lever 44 and/or the end 48 of the guide lever 44 in the slider is moved in a direction A by the pressure of the cleaning fluid. Since the cleaning nozzle 30 is supported on a bearing which defines the rotational axis 38 and the end 46 of the guide lever 44 is supported on the cleaning nozzle 30, the cleaning nozzle 30 is extended by the guide lever 44. The cleaning nozzle 30 then moves around the rotational axis 38. The same cleaning fluid, which applies the extension pressure, can then be applied to the viewing area 20 after extension. A return to the retracted position (FIG. 10) can preferably be carried out by means of a return spring, for example installed in a pressure cylinder or in the extension mechanism itself. Alternatively, an additional actuating unit such as an electric motor, a hydraulic/pneumatic cylinder or a magnetic drive can be used. The end 48 is preferably moved in the slider 56 by the fluid pressure which can build up in a pressure cylinder 58. FIGS. 10 and 11 also show a supply line 60 for supplying the cleaning fluid.

Figure 12:
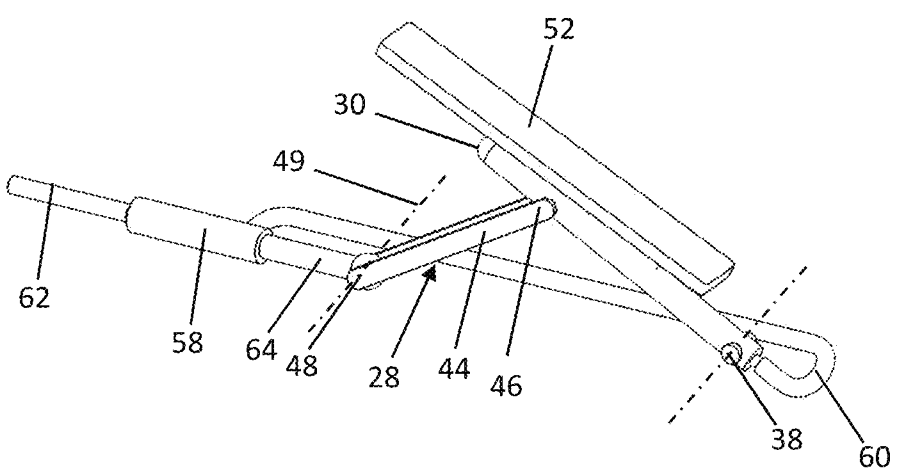
FIG. 12 shows a schematic detailed view of FIGS. 10 and 11.
Figure 13:
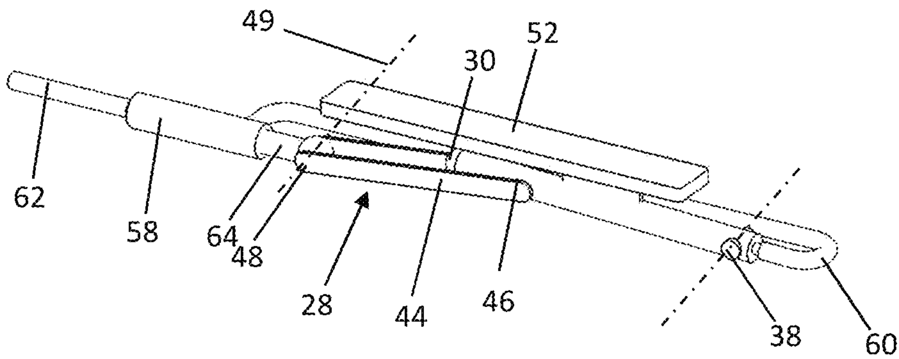
FIG. 13 shows a schematic detailed view of FIGS. 10 and 11.

FIGS. 12 and 13 show the displacement mechanism for retracting and extending the cleaning nozzle 30 from FIGS. 10 and 11 in isolated form. The slider is not shown.

Figure 14:
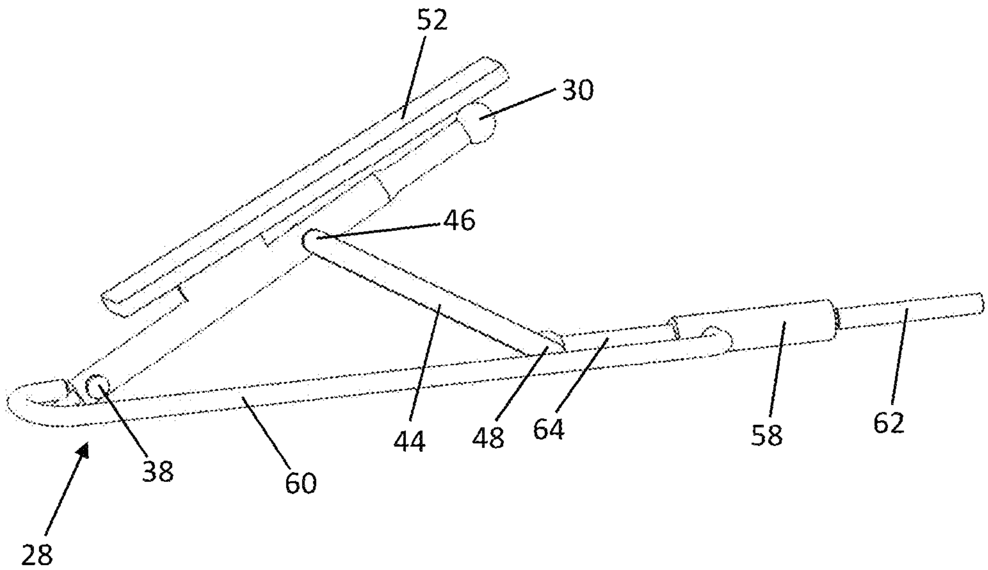
FIG. 14 shows a schematic detailed view of a further embodiment.

In a further embodiment, shown in FIG. 14, the cleaning nozzle 30 can also have several openings in order to cover a larger cleaning area on the viewing area 20.

In FIGS. 12 to 14, a tube connection for connecting the cleaning fluid to the pressure cylinder 58 for the pressure drive for extending the cleaning nozzle 30 is labeled 62.

It is also understood that the slider 56 is purely optional, and the end 48 can, for example, also be connected only to an end area 64 of the pressure cylinder 58. In this context, it is preferable if the pressure cylinder 58 is mounted and/or held in a rotationally fixed manner, preferably parallel to the direction A. As a result, the cylinder can preferably only perform a linear movement along the A direction.

Figure 15:
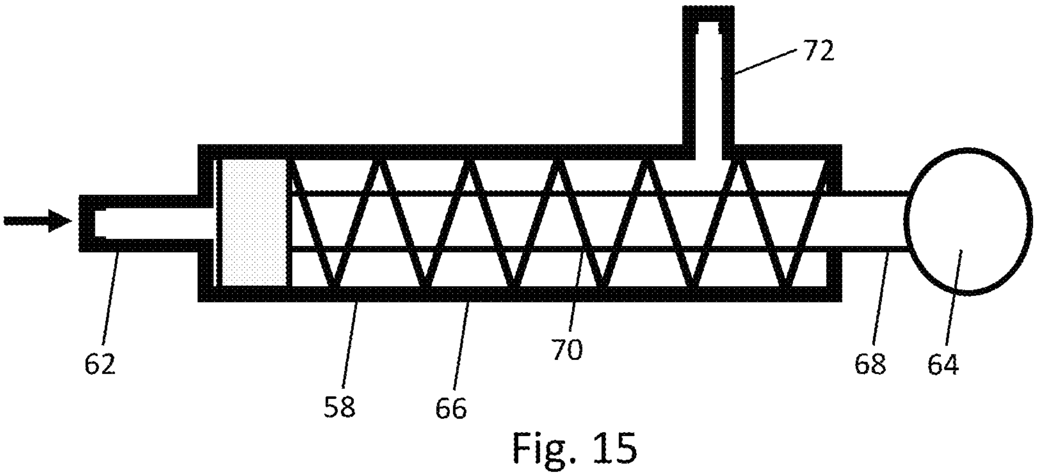
FIG. 15 shows a schematic detailed view of a displacement component according to an exemplary embodiment.
Figure 16:
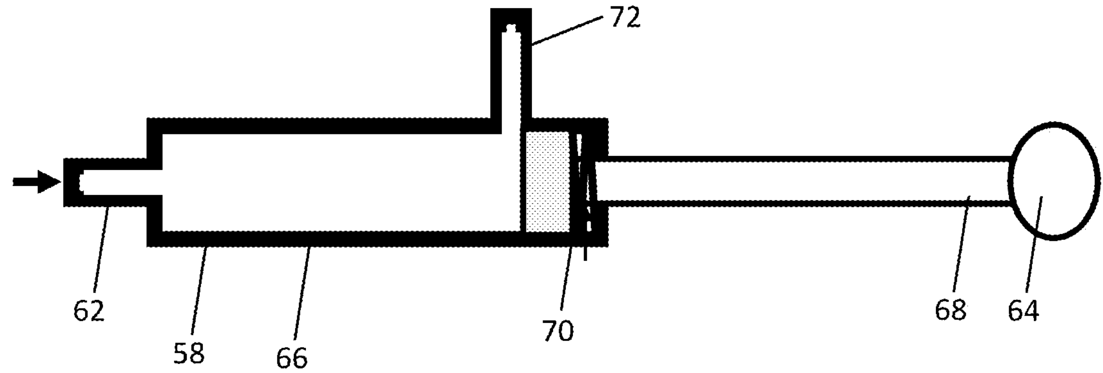
FIG. 16 shows a schematic detailed view of a displacement component according to an exemplary embodiment.

FIGS. 15 and 16 show a possible realization of the pressure cylinder 58. The pressure cylinder 58 preferably serves as an actuator for displacing the cleaning nozzle 30. The pressure cylinder 58 preferably uses the pressure and/or volume flow of the cleaning fluid to actuate the guide lever 44 and to direct the pressure and/or volume flow to the cleaning nozzle 30 preferably simultaneously or with a time delay. The pressure cylinder 58 preferably has a cylinder 66, a piston 68, a spring 70, the tube connection 62 and a cleaning nozzle connection 72.

LIST OF REFERENCE NUMERALS

10 roof module
12 panel component
14 roof skin
16 sensor module
18 sensor casing
20 viewing area
22 environment sensor
26 optical axis
28 cleaning apparatus
30 cleaning nozzle
36 movement axis
38 rotational axis
40 telescopic segment
42 telescopic segment
44 guide lever
46 end
47 second movement axis

48 end
49 second rotational axis
50 support component
52 cover
54 wind deflector
56 slider
58 pressure cylinder
60 supply line
62 tube connection
64 end area
66 cylinder
68 piston
70 jump
72 cleaning nozzle connection
100 vehicle roof
102 transverse beam
104 roof frame
106 longitudinal beam
108 panoramic roof
1000 motor vehicle
A direction
x longitudinal vehicle direction
y vehicle width direction
z vehicle height direction

The invention claimed is:

1. A sensor module for being fixed to a motor vehicle, the sensor module comprising:
- at least one environment sensor,
- a panel component having a viewing area, through which the at least one environment sensor transmits and/or receives electromagnetic signals for charting an environment of the motor vehicle, and
- at least one cleaning apparatus, which has at least one cleaning nozzle by which the viewing area is cleanable,
- wherein the at least one cleaning apparatus has a guide lever which is rotationally connected to the at least one cleaning nozzle and which guides the at least one cleaning nozzle for a combined longitudinal movement along a movement axis and a rotational movement about a rotational axis,
- wherein the at least one cleaning nozzle has a telescope nozzle having at least two telescopic segments, one of the at least two telescopic segments being movable in relation to the other of the at least two telescopic segments via the longitudinal movement along the movement axis, the at least one guide lever being mounted at one end so as to be rotational at one of the at least two telescopic segments, and the guide lever being mounted at an other end so as to be rotational at a support component of the sensor module.

2. The sensor module according to claim 1, wherein the at least one cleaning nozzle is displaceable between retracted position and an extended position owing to the combined longitudinal movement and rotational movement.

3. The sensor module according to claim 2, wherein the at least one cleaning apparatus comprises a cover, which aligns flush with the panel component in the retracted position of the at least one cleaning nozzle.

4. The sensor module according to claim 3, wherein the cover has a wind deflector for deflecting an airflow from the at least one cleaning nozzle and/or from the at least one part of the viewing area, the wind deflector being disposed on the cover or being formed in one piece with the cover.

5. The sensor module according to claim 1, wherein the guide lever translates the longitudinal movement along the movement axis into the rotational movement about the rotational axis.

6. The sensor module according to claim 1, wherein the wind deflector defines a wind-deflector surface, which extends along the movement axis or a second movement axis and transverse to the movement axis and transverse to the rotational axis, at least in the extended position of the at least one cleaning nozzle.

7. The sensor module according to claim 1, wherein the at least one cleaning nozzle is movable via a fluid pressure of a cleaning fluid and/or via an electric and/or hydraulic and/or pneumatic drive.

8. A roof module for forming a vehicle roof on a vehicle, the roof module having a panel component, which forms at least a section of a roof skin of the vehicle roof, the roof skin functioning as an outer sealing surface of the roof module, the roof module having at least one sensor module according to claim 1.

9. A motor vehicle having at least one sensor module according to claim 1 and further comprising a roof module having a panel component, which forms at least a section of a roof skin of the motor vehicle roof, the roof skin functioning as an outer sealing surface of the roof module, the roof module having at least one sensor module.

10. A sensor module for being fixed to a motor vehicle, the sensor module comprising:
- at least one environment sensor,
- a panel component having a viewing area, through which the at least one environment sensor transmits and/or receives electromagnetic signals for charting an environment of the motor vehicle, and
- at least one cleaning apparatus, which has at least one cleaning nozzle by which the viewing area is cleanable,
- wherein the at least one cleaning apparatus has a guide lever which is rotationally connected to the at least one cleaning nozzle and which guides the at least one cleaning nozzle for a combined longitudinal movement along a movement axis and a rotational movement about a rotational axis,
- wherein the environment sensor has an optical axis, the at least one cleaning nozzle being disposed transverse to the optical axis in such a manner that the movement axis or the second movement axis is aligned transverse to the optical axis and the rotational axis is aligned essentially parallel to the optical axis.

11. A sensor module for being fixed to a motor vehicle, the sensor module comprising:
- at least one environment sensor,
- a panel component having a viewing area, through which the at least one environment sensor transmits and/or receives electromagnetic signals for charting an environment of the motor vehicle, and
- at least one cleaning apparatus, which has at least one cleaning nozzle by which the viewing area is cleanable,
- wherein the at least one cleaning apparatus has a guide lever which is rotationally connected to the at least one cleaning nozzle and which guides the at least one cleaning nozzle for a combined longitudinal movement along a movement axis and a rotational movement about a rotational axis,
- wherein the at least one cleaning nozzle is displaceable between retracted position and an extended position owing to the combined longitudinal movement and rotational movement,
- wherein the at least one cleaning apparatus comprises a cover, which aligns flush with the panel component in the retracted position of the at least one cleaning nozzle, wherein the cover has a wind deflector for deflecting an airflow from the at least one cleaning nozzle and/or from the at least one part of the viewing area, the wind deflector being disposed on the cover or being formed in one piece with the cover, and wherein the wind deflector is made of a flexible mat-shaped material which extends between the cover and the panel component.

* * * * *